May 3, 1927.  
E. P. WEBSTER  
1,627,364  
BISCUIT REMOVAL MEANS  
Filed March 11, 1925  
4 Sheets-Sheet 4
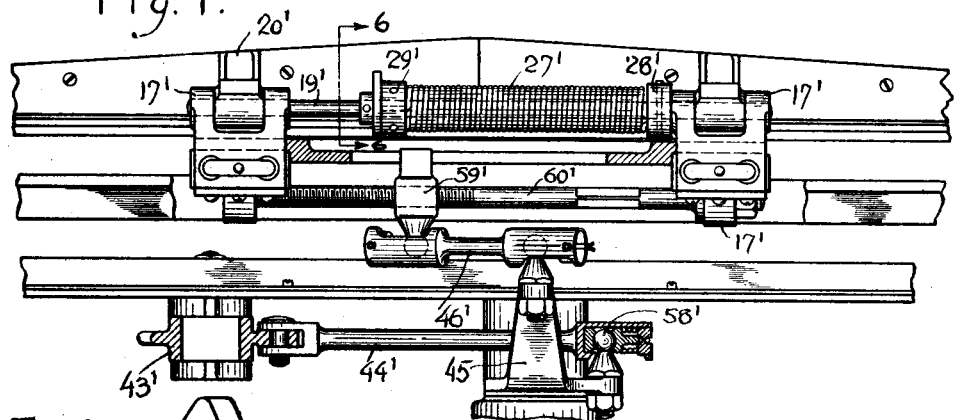
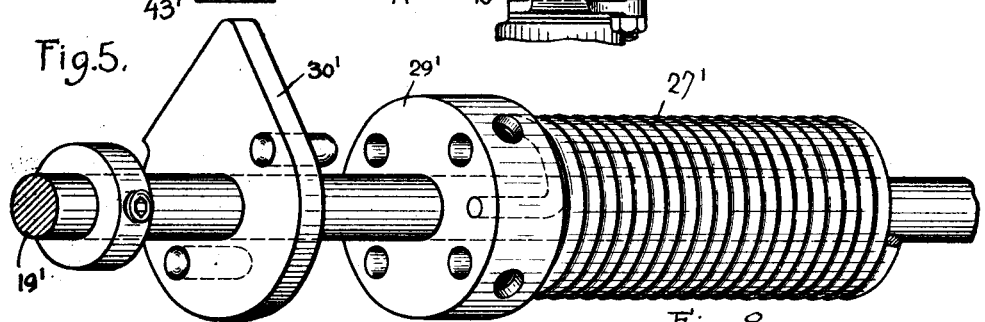
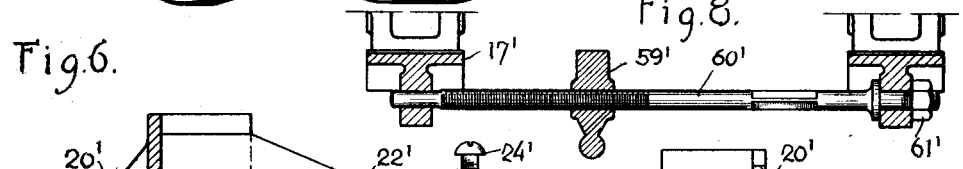
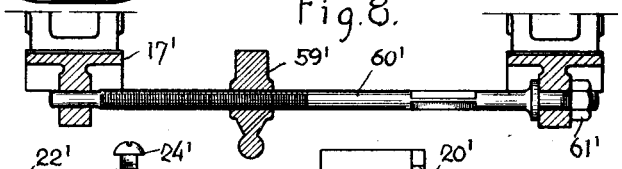
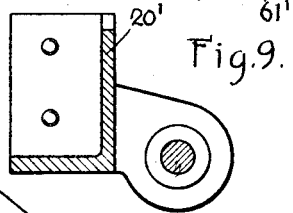
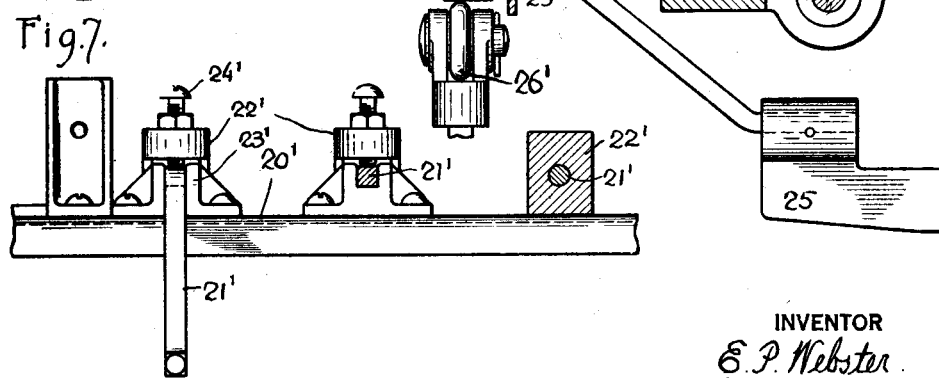
INVENTOR  
E. P. Webster  
BY  
E. W. Anderson  
ATTORNEY Patented May 3, 1927.

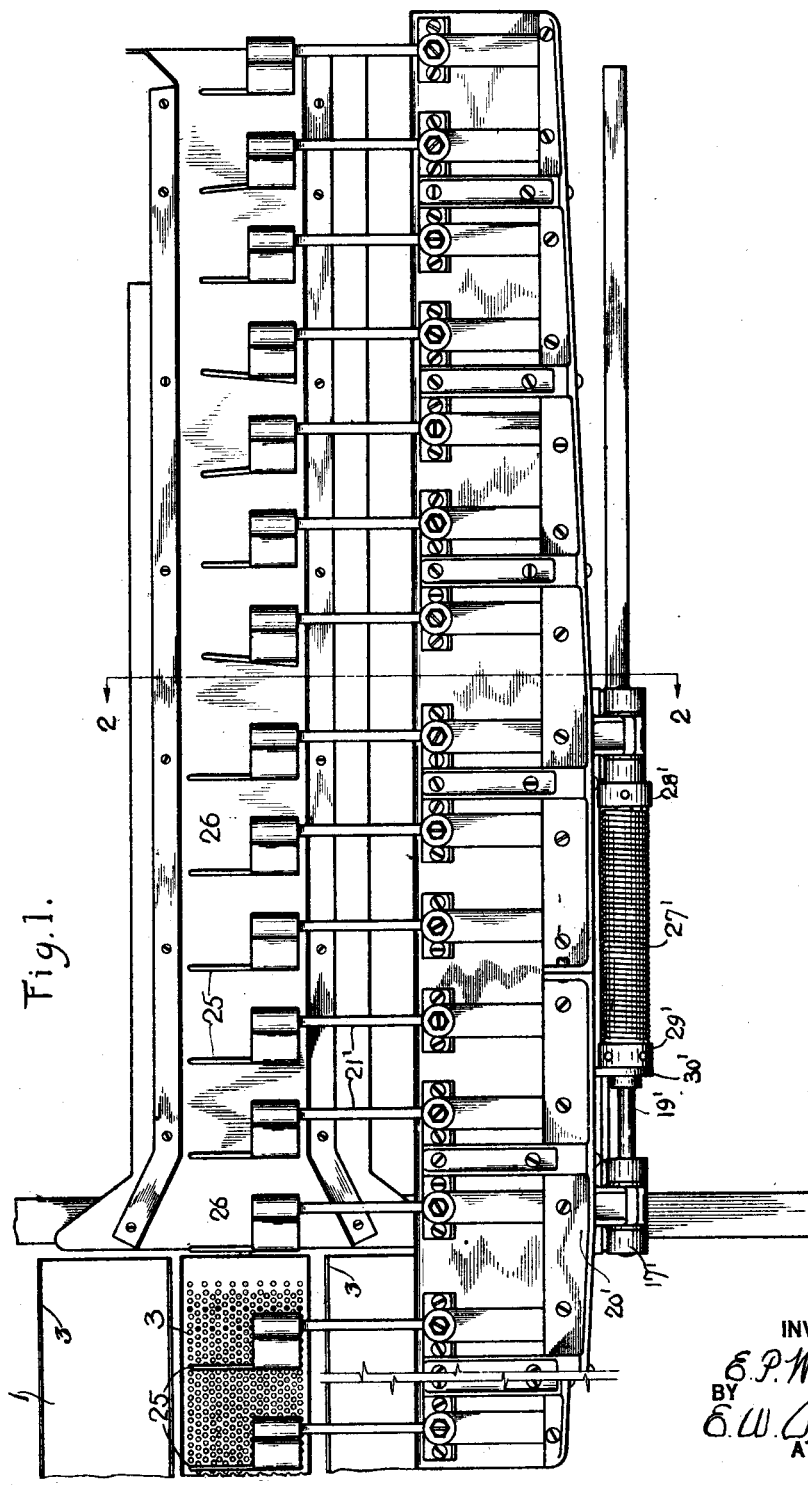

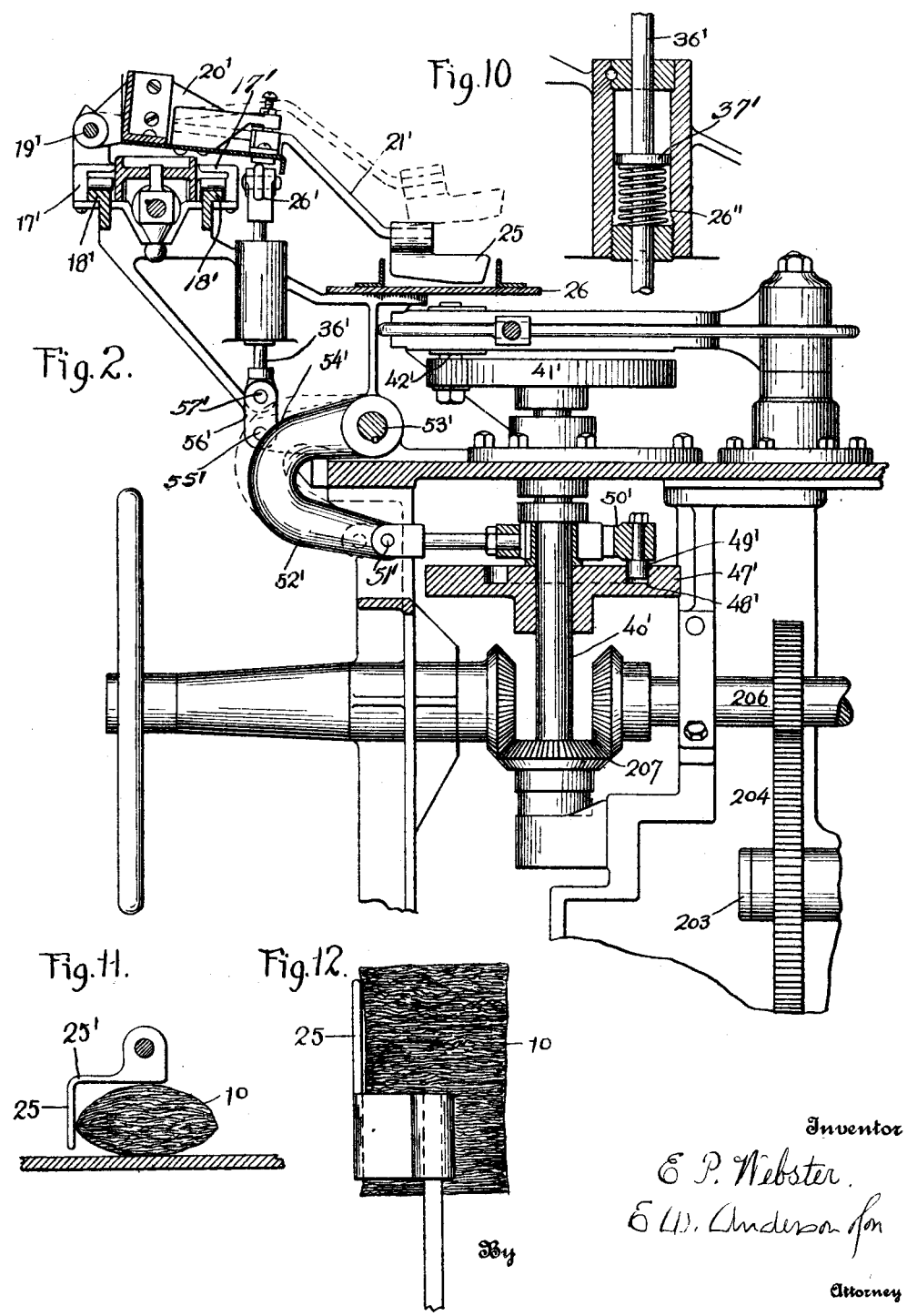

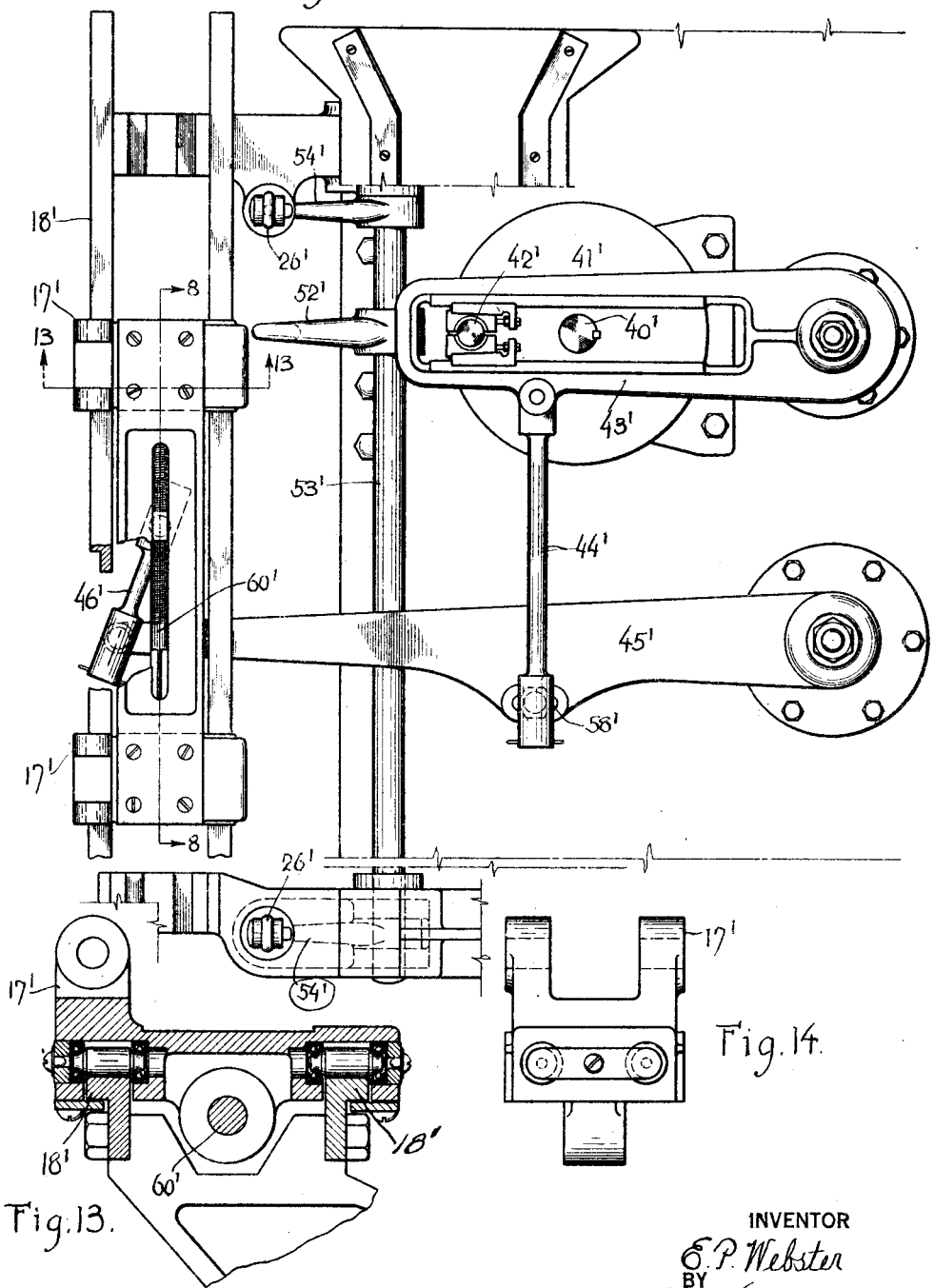

1,627,364

UNITED STATES PATENT OFFICE.

EARL P. WEBSTER, OF NIAGARA FALLS, NEW YORK, ASSIGNOR TO THE SHREDDED WHEAT COMPANY, OF NIAGARA FALLS, NEW YORK, A CORPORATION OF NEW YORK.

BISCUIT-REMOVAL MEANS.

Application filed March 11, 1925. Serial No. 14,726.

This invention relates to apparatus for the manufacture of food products of the type in which uncooked products are placed upon a conveyor, carried through a baking oven and, if desired, a drying chamber, and then transferred from the conveyor to the place where the products are to be placed in cartons. More particularly, the present invention has to do with a device by which the uncooked products are removed from the conveyor and delivered to the packing station, and the present invention is of particular utility in connection with the manufacture of food products of a fragile character, such as shredded wheat biscuits. Accordingly, an embodiment of the invention suitable for the manufacture of such biscuits will be described, though it is to be understood that the utility of the invention is not limited to any particular product.

In the manufacture of shredded wheat biscuits, the handling of the biscuits after they are baked is a difficult operation, owing to the fact that the biscuits are of a delicate structure and are easily broken. In the production of such biscuits automatically, it is necessary to provide mechanism by which the baked biscuits can be rapidly removed from the conveyor which carries them through the oven and delivered to automatic packing mechanism, and in such removal the biscuits must be kept from injury and must be maintained under exact control throughout their removal and delivery to the packing devices.

The object of the present invention is to provide a device for removing the biscuits from the conveyor, which is of improved construction and capable of use in connection with an automatic carton-filling machine. This device operates to remove the biscuits from the conveyor in groups suitable for introduction into the cartons, and the device is provided with individual biscuit engaging members arranged in an aligned series. In the operation of the device, this series of members is moved out over the conveyor on which the biscuits are carried, is lowered so that the members enter the spaces between adjacent biscuits, and then in this lowered position, is moved away from the conveyor to transfer a group of biscuits in single file from the conveyor to a suitable receiving surface. The number of biscuit engaging members in the series is greater than the number of biscuits removed from the conveyor in a single operation of the device, so that at each operation a group of biscuits is transferred from the conveyor to the surface and a group previously transferred is moved along the surface toward the packing station. These members are arranged so that the biscuits moved along the surface eventually reach a position where they are to be introduced by appropriate mechanism into the carton, and the biscuits so delivered are in groups suitable for introduction into the cartons as a unit, with the members of each group positioned so that this carton-filling operation is facilitated and damage to the biscuits is prevented.

In one embodiment, the device includes reciprocatory heads which move toward and away from the conveyor as a unit, one of these heads carrying the biscuit engaging members arranged in an aligned series. This head has a rocking movement with reference to the other about an axis which extends lengthwise of the series, and in the operation of the device the two heads are moved as a unit toward the conveyor, with the movable head in its upper position. At the end of the movement toward the conveyor, the upper head is lowered so that the biscuit engaging members may enter the spaces between individual biscuits on the conveyor and with the upper head in this position the two heads are moved as a unit away from the conveyor, so that each member carries a biscuit with it. At the end of the movement away from the conveyor the upper head is raised so that the biscuits transferred from the conveyor to the receiving surface are released. Then the heads are returned to the position over the conveyor, and the cycle of operations repeated.

For a better understanding of the invention, reference will be made to the accompanying drawings, in which—

Figure 1 is a plan view of the invention, partly broken away.

Figure 2 is a section on the line 2—2, Figure 1.

Figure 3 is a plan view of the invention with the upper head and biscuit removal rake removed.

Figure 4 is a rear view of the invention, partly in section.

Figure 5 is a detail perspective view showing the spring and the tension adjusting means therefor spaced therefrom.

Figure 6 is a detail section on the line 6—6, Figure 4.

Figure 7 is a detail front view of a part of the biscuit removal rake.

Figure 8 is a detail sectional view of the threaded rod taken longitudinally and centrally thereof.

Figure 9 is a detail sectional view of a part of the upper head of the biscuit removal rake.

Figure 10 is a detail sectional view showing the cushioning device for the rollers of the biscuit removal means.

Figures 11 and 12 show detail end and plan views of one of the biscuit removal blades and its carrier rod.

Figure 13 is a section on the line 13—13, Figure 3.

Figure 14 is a detail side view of a part of the lower head of the biscuit removal rake.

In these drawings the numeral 1 designates the baking conveyor which is provided with transverse pans or trays 3, in each of which is carried a plurality of biscuits 10 arranged in a row. In the movement of this conveyor, these trays are brought successively into registration with the biscuit removal device constituting the present invention.

The biscuit removal device includes a reciprocatory lower carrier or head 17', moving back and forth transversly of the conveyor 1 and slidable upon frame rails 18', said head carrying rod 19', to which is pivoted an upper carrier or head 20', whereon are mounted the biscuit removal blades 25, each fast to the lower free end of a rod 21', said rod at its upper end being seated in socket piece 22' and having a squared portion seated in squared groove of piece 23', both carried by said upper head, and the socket piece having an extension provided with set screw 24', overlying said grooved piece and engaging the squared portion of said rod to adjustably hold the rod in position.

In the operation of the device, the heads are moved as a unit toward the conveyor, then the upper head 20' is swung downwardly so that the individual members enter the spaces between adjacent biscuits in a row on the pan. The heads now move as a unit away from the conveyor, moving the biscuits from the pan to a receiving surface which is in the form of an inspection table or platform 26 in alignment with the trays and at substantially the same level. At the end of the movement of the heads away from the conveyor, the upper head is swung upwardly on its pivot to disengage the biscuits and the heads then return to their original position over the next pan on the conveyor. The head 20' is pivoted along one side and slidable on a rod 19' which extends lengthwise of the lower head 17', and the free edge of the head 20' is supported by rollers 26' upon which it rides to and fro. These rollers hold the biscuit removal blades 25 slightly above the bottoms of the trays 3 and the inspection table in the lowermost position of the head. The head is held against the rollers by a spring 27' encircling the rod 19', one end of the spring being secured to a collar 28' fast on the rod, and the other to a collar 29' loose on the rod but secured by pins to a collar 30' loose on the rod but attached to the head. The tension of the spring may be adjusted by altering the position of the collar 29' with reference to collar 30'.

The weight of the upper rake head 20' and the pressure of the spring 27' which forces this head against the rollers 26' are opposed or counterbalanced by the springs 26'' encircling the stem 36' of each roller and bearing against a collar 37' fast on this stem. These springs are disposed within barrels mounted in the frame through which the stems extend, as shown in Fig. 10, and the presence of these springs facilitates the rocking of the upper head 20' on the rod 19' without interfering with the action of the spring 27'.

The upper and lower heads 20' and 17' are moved back and forth in the removal of successive transverse rows of biscuit from the trays 3 of the conveyor 1, said upper head carrying the biscuit removal blades and being at the end of its effective stroke raised pivotally upon rod 19' transversely of the biscuit row to clear said blades from the biscuit, returned horizontally to position ready to engage between the biscuit of the row next to be removed and lowered pivotally and vertically upon said rod transversely of the row of biscuit to first position with the blades 25 properly positioned relative to the biscuit to be removed, the means for this purpose being described as follows:

A drive shaft 206 has bevel gear connection 207 with vertical shaft 40' whereon is fast disk 41' having eccentric pin connection 42' with lever 43', the latter having link connection 44' with another lever 45' working in parallel with lever 43' and having at its outer end a link connection 46' with said lower head, and thereby giving the upper and lower heads the reciprocatory movement referred to.

The vertical shaft 40' has fast thereon another disk 47', having eccentric or cam groove 48' wherein works roller pin 49', located at one end of a link 50', the other end of said link having at 51' pivotal connection with a bent lever 52', fast to shaft 53', and serving in the rotation of vertical shaft 40' to rock the shaft 53', the latter having fast thereto arms 54' provided at their outer ends with pivotal connection 55' each with link 56', said link having pivotal connection 57' with the lower end of the stem 36' wherein each roller 26' is mounted, whereby said stems and said rollers will be periodically raised and lowered at the proper times to accomplish the results stated. Since the rock shaft 53' is actuated by the link 50' which is positively moved by reason of the roller 49' running in a groove in the disc 47', it follows that the tiltable head 20' is positively held in position at all times, and there is no possibility that the head may drop from its upper position and crush the biscuits. In order to provide for an adjustment of the stroke of the lever 45' to adjust the movement of reciprocation of the upper and lower rake heads 20' and 17', the connection of the link 44' with the lever 45' is a slot and pin connection 58', the location being about midway of the length of lever 45' and admitting of a delicate adjustment of the length of stroke by adjustment of the pin in the slot of the lever.

The link connection 46' of the lever 45' with the lower rake head 17' is made through the medium of a nut 59' threaded upon a rod 60' fast to said lower head, the adjustment of said nut along said rod serving to adjust the upper and lower rake heads and the biscuit removal blades into proper relation to the biscuit to be removed, and being accomplished by loosening the nut 61' threaded upon one end of said rod, rotating said rod to adjust the nut 59' and tightening the end nut 61' upon said rod to hold the adjustment of nut 59'. The pivotal connections of link 44' with lever 45', of lever 45' with link 46' and of link 46' with the lower head 17' are ball and socket connections for the purpose of reducing friction, etc.

The biscuit removal blades 25 are provided each with an upper right angle extension 25' overlying the biscuit related thereto and adapted to hold the biscuit down during the movement thereof, so that the biscuit in their removal are prevented from turning over.

The biscuit removal device is provided with nineteen blades 25, and moves six biscuit from the conveyor 1 upon the inspection table 26 upon each stroke thereof, the initial operation of the said device removing six biscuit from conveyor to table, the next operation removing a similar number of biscuit upon said table and the first named six biscuit farther along said table, and the next operation removing a similar number of biscuit upon said table and the second group of six biscuit farther along said table and the first group of six biscuit farther along said table into position adjacent the packing machine (not shown) the nineteenth blade being a clean off blade.

The movement of the biscuit removal blades upwardly and downwardly pivotally is in a vertical plane for each blade transversely of the related row of biscuit, in order to facilitate the positioning of the blades relative to the biscuit to be removed and the disengagement of the blades from between the biscuit.

It will be noted that the third pusher member from the right-hand end of the series as viewed in Fig. 1, is straight and substantially at right angles to the direction of movement of the biscuits, while the second and fourth pusher members are inclined toward the third. Similarly, the sixth pusher member from the right is straight and the fifth and seventh inclined toward it. In the operation of the device, a group of six biscuits is removed from a tray or pan at each movement, and this group is advanced across platforms 26 in successive steps. In the last step, the six biscuits are engaged by the second to seventh pusher members from the right in Fig. 1, and owing to inclination of the pusher members, as above described, the six biscuits are finally left upon platform 26 in the form of two minor groups of three biscuits each, with the end biscuits of each group converging toward the central biscuit. This arrangement of the biscuits facilitates their handling thereafter by automatic packaging machines.

I claim:—

1. In biscuit removal means, a conveyor, and means for removing successive rows of biscuit therefrom including a pusher member for each biscuit, and means for moving said members pivotally downward in vertical planes transversely of and at right angles to the related row to engage between the biscuit, horizontally to remove the biscuit, pivotally upward in vertical planes and horizontally to first position.

2. In biscuit removal means, a conveyor, and means for removing successive rows of biscuit therefrom including a pusher member for each biscuit, and means for moving said members pivotally downward in vertical planes transversely of and at right angles to the related row to engage between the biscuit, horizontally to remove the biscuit, pivotally upward in vertical planes and horizontally to first position.

3. In biscuit removal means, a conveyor, and means for removing successive rows of biscuit therefrom including a pusher member for each biscuit adapted to hold down the biscuit, and means for moving said members pivotally downward in vertical planes transversely of and at right angles to the related row to engage between the biscuit, horizontally to remove the biscuit, pivotally upward in vertical planes and horizontally to first position.

4. In biscuit removal means, a conveyor, and means for removing successive rows of biscuit therefrom including a pusher member for each biscuit having an angular extension overlying and holding down the biscuit, and means for moving said members pivotally downward transversely of the related row to engage between the biscuit, horizontally to remove the biscuit, pivotally upward and horizontally to first position.

5. In biscuit removal means, a conveyor, and means for removing successive rows of biscuit therefrom including a pusher member for each biscuit, and means for moving said members pivotally downward in vertical planes transversely of and at right angles to the related row to engage between the biscuit, horizontally to remove the biscuit, pivotally upward in vertical planes and horizontally to first position including actuating means positively holding the pusher members in raised position during their return stroke.

6. In biscuit removal means, a conveyor, and means for removing successive rows of biscuit therefrom including a pusher member for each biscuit, and means for moving said members pivotally downward transversely of the related row to engage between the biscuit, horizontally to remove the biscuit, pivotally upward and horizontally to first position including a head carrying said members and pivoted at one side and at its other side having slidable engagement with supports, and means for raising and lowering said supports to raise and lower said head.

7. In biscuit removal means, a conveyor, and means for removing successive rows of biscuit therefrom including a lower head, an upper head pivoted at one side to said lower head and at its other side having slidable engagement with supports, pusher members one for each biscuit carried by said upper head, and means for moving said upper head and said lower head to move said members pivotally downward transversely of the related row to engage between the biscuit, horizontally to remove the biscuit pivotally upward and horizontally to first position, including means for raising and lowering said supports to raise and lower said upper head.

8. In biscuit removal means, a conveyor, and means for removing successive rows of biscuit therefrom including a head pivoted at one side and at its other side having slidable engagement with supports, pusher members one for each biscuit carried by said head, and means for moving said head to move said members pivotally downward transversely of the related row to engage between the biscuit, horizontally to remove the biscuit, pivotally upward and horizontally to first position including means for raising and lowering said supports to raise and lower said head, a spring for depressing said head against said supports, and means for counterbalancing the weight of said head and its pusher members and for counterbalancing the spring pressure of said against the raising and lowering means for said supports adapted to retain the spring pressure of said head against said supports.

9. In biscuit removal means, a conveyor, and means for removing successive rows of biscuit therefrom including a lower head, an upper head pivoted at one side to said lower head and at its other side having slidable engagement with supports, pusher members one for each biscuit carried by said upper head, and means for moving said upper head and said lower head to move said members pivotally downward transversely of the related row to engage between the biscuit, horizontally to remove the biscuit pivotally upward and horizontally to first position including means for raising and lowering said supports to raise and lower said upper head, a spring for depressing said upper head against said supports, and means for counterbalancing the weight of said head and its pusher members and for counterbalancing the spring pressure of said head against the raising and lowering means for said supports adapted to retain the spring pressure of said head against said supports.

10. In biscuit removal means, a conveyor, and means for removing successive rows of biscuit therefrom including a lower head, an upper head pivoted at one side to said lower head and at its other side having slidable engagement with support rollers, pusher members one for each biscuit carried by said upper head, and means for moving said upper head and said lower head to move said members pivotally downward transversely of the related row, horizontally, pivotally upward and horizontally to first position, including parallel movement levers for moving said heads horizontally and having a connecting link provided with an adjustable connection with one of said levers to adjust the length of stroke of said heads.

11. In biscuit removal means, a conveyor, and means for removing successive rows of biscuit therefrom including a lower head, an upper head pivoted at one side to said lower head and at its other side having slidable engagement with support rollers, pusher members one for each biscuit carried by said upper head, and means for moving said upper head and said lower head to move said members pivotally downward transversely of the related row, horizontally, pivotally upward and horizontally to first position including a threaded rod carried by said lower head, a nut thereon, and an operating lever having a link connection with said nut, the adjustment of the latter upon said threaded rod serving to adjust the position of the pusher members relative to the biscuit.

12. In biscuit removal means, a conveyor, and means for removing successive rows of biscuit therefrom including a lower head, an upper head pivoted at one side to said lower head and at its other side having slidable engagement with support rollers, pusher members one for each biscuit carried by said upper head, and means for moving said upper head and said lower head to move said members pivotally downward transversely of the related row, horizontally, pivotally upward and horizontally to first position including an operating lever device having means for adjusting the length of stroke and means for adjusting the position of the pusher members relative to the biscuit.

13. In biscuit removal means, a conveyor, and means for removing successive rows of biscuit therefrom including a lower head, an upper head pivoted at one side to said lower head and at its other side having slidable engagement with support rollers, pusher members one for each biscuit carried by said upper head, and means for moving said upper and lower heads to move said members pivotally downward transversely of the related row, horizontally, pivotally upward and horizontally to first position including means for raising and lowering said support rollers to raise and lower said upper head, and parallel movement levers for moving said heads horizontally and having a connecting link provided with an adjustable connection with one of said levers to adjust the stroke, one of said levers having an adjustable connection with said lower head to adjust the position of the pusher members relative to the biscuit.

14. In biscuit removal means, a conveyor, and means for removing successive rows of biscuit therefrom including a lower head, an upper head pivoted at one side to said lower head and at its other side having slidable engagement with support rollers, pusher members one for each biscuit carried by said upper head, and means for moving said heads to move said members pivotally downward, horizontally, pivotally upward and horizontally to first position including eccentrically operated means for raising and lowering said support rollers to raise and lower said upper head, and eccentrically operated parallel movement levers for moving said heads horizontally and having a connecting link provided with an adjustable connection with one of said levers to adjust the stroke, one of said levers having an adjustable connection with said lower head to adjust the position of the pusher members relative to the biscuit.

15. The combination of a conveyor adapted to carry biscuits, a plurality of individual biscuit engaging members arranged in an aligned series, and means for moving the series of members longitudinally toward and away from the conveyor and for swinging the series of members at spaced points in the said longitudinal movement about an axis extending lengthwise of the series.

16. The combination of a conveyor adapted to carry biscuits, a plurality of individual biscuit engaging members arranged in alignment and extending in a direction transverse to the direction of conveyor movement, means for moving the members as a unit toward and away from the conveyor, and means for swinging the members as a unit at spaced points in the said movement about an axis extending parallel to the direction of said movement.

17. The combination of a conveyor adapted to carry biscuits, a receiving surface arranged adjacent the conveyor, an aligned series of individual biscuit engaging members, and means for moving the series over the surface toward and away from the conveyor and for swinging the series of members toward and away from the surface about an axis extending lengthwise of the series, the extent of the movement of the series toward and away from the conveyor being less than the length of the series, whereby biscuits are transferred from the conveyor to the surface in single file and moved over the surface in successive steps.

18. The combination of a conveyor adapted to carry biscuits, a pair of heads movable toward and away from the conveyor, one of these heads being pivotally mounted on the other to swing about an axis extending lengthwise of the heads, a plurality of biscuit engaging members mounted on the swinging head and arranged in alignment lengthwise thereof, means for moving the heads in unison toward and away from the conveyor, and means for swinging the pivotally mounted head on its pivot at spaced points in the movement of the heads.

19. The combination of a conveyor adapted to carry biscuits, a pair of heads movable toward and away from the conveyor, one of these heads being pivotally mounted on the other to swing about an axis extending lengthwise of the heads, a plurality of individual biscuit engaging members disposed on the swinging head, a rock lever operable to move the heads in unison toward and away from the conveyor, supports for the pivotally mounted head, and means for raising and lowering the supports to swing the said head with reference to the other.

20. The combination of a conveyor provided with a plurality of pans for carrying biscuits in rows extending transverse to the direction of conveyor movement, a receiving surface arranged adjacent the conveyor with which the trays are brought successively into registry, biscuit engaging members arranged in a series extending transverse to the direction of conveyor movement and lying above the surface, and means for moving the series of members lengthwise over the surface and above a conveyor pan in registry therewith and for swinging the series of members about an axis extending lengthwise of the series toward and away from the surface.

21. In a biscuit removal device, the combination of a platform, a series of blades movable to engage individual biscuits on the platform, means for moving the series of blades to advance the biscuits along the platform to a selected part of the latter, and means operable to move the blades out of engagement with the biscuits, certain of the blades being arranged to leave the biscuits on the platform in groups in which certain biscuits lie with their long axes at an angle to the long axes of other biscuits in the group.

22. In a biscuit removal device, the combination of a platform, a series of blades movable to engage individual biscuits in a row on the platform, means for moving the series of blades to advance the biscuits along the platform to a selected part of the latter, and means operable to move the blades into and out of engagement with the biscuits, the blades of the series being so formed as to leave the biscuits arranged in groups on the platform, with the end biscuits of each group converging.

In testimony whereof I affix my signature.

EARL P. WEBSTER.